United States Patent [19]

Lohse et al.

[11] 4,383,107
[45] May 10, 1983

[54] MIXTURE CONTAINING N-CYANOLACTAM FOR THE PREPARATION OF NITROGEN-CONTAINING POLYADDUCTS

[75] Inventors: Friedrich Lohse, Oberwil; Dieter Trachsler, Kaiseraugst, both of Switzerland; Claude Jeannerat, Hegenheim, France

[73] Assignee: Ciba-Geigy Corporation, Ardsley, N.Y.

[21] Appl. No.: 293,560

[22] Filed: Aug. 17, 1981

[30] Foreign Application Priority Data

Aug. 28, 1980 [CH] Switzerland ................... 6484/80

[51] Int. Cl.$^3$ .................................................. C08G 69/14
[52] U.S. Cl. ................................... 528/323; 528/310; 528/326; 528/367
[58] Field of Search ............... 528/323, 326, 310, 367

[56] References Cited

U.S. PATENT DOCUMENTS

| | | |
|---|---|---|
| 3,291,673 | 12/1966 | Sugino et al. |
| 3,308,101 | 3/1967 | Ikeda |
| 3,779,997 | 12/1973 | Langager |
| 3,944,526 | 3/1976 | Kray |
| 4,031,067 | 6/1977 | Sundermann et al. |
| 4,049,711 | 9/1977 | Kray |
| 4,059,567 | 11/1977 | Sundermann et al. |
| 4,066,577 | 1/1978 | Sundermann et al. |
| 4,075,185 | 2/1978 | Kray |

OTHER PUBLICATIONS

CA, 68, 78749z (1968).
CA, 73, 99400x (1970).
CA, 60, 15835d (1964).

*Primary Examiner*—Harold D. Anderson
*Attorney, Agent, or Firm*—Luther A. R. Hall

[57] ABSTRACT

A mixture for the preparation of novel crosslinked nitrogen-containing polyadducts, which comprises (a) an N-cyanolactam of the formula I or II

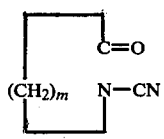

(I)

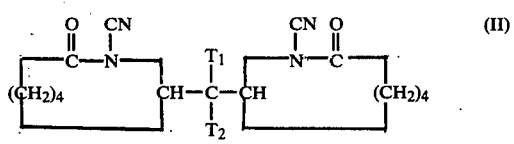

(II)

and (b) a monomeric or oligomeric organic compound having at least 2 C atoms and at least 2 amino groups or at least 1 amino group and 1 hydroxyl group.

The curable mixtures of components (a) and (b) and, if desired, a monoamino compound are suitable for use as casting resins or adhesives, or for the preparation of foams and coatings.

The symbols are each as defined in claim 1.

10 Claims, No Drawings

MIXTURE CONTAINING N-CYANOLACTAM FOR THE PREPARATION OF NITROGEN-CONTAINING POLYADDUCTS

The invention relates to a mixture for the preparation of novel crosslinked nitrogen-containing polyadducts. The mixture contains an organic compound having at least 2 C atoms and at least 2 amino groups or at least one amino group and one hydroxyl group, and an N-cyanolactam.

German Offenlegungsschrift No. 2,533,119 has disclosed the preparation of high-molecular polytriazines by reacting difunctional and polyfunctional aromatic cyanamides at an elevated temperature with difunctional and polyfunctional aromatic cyanates. Analogously, substituted polytriazines are obtained by reacting aromatic cyanates with aromatic N-cyanosulfonamides, as described in German Offenlegungsschrift No. 2,533,126, or by a polyaddition of N-cyanamidoaryl cyanates. U.S. Pat. Nos. 4,049,711, 3,944,526 and 4,075,185 describe the polyaddition of cyanamide groups to N-cyanosulfonamide groups.

It is also known from German Offenlegungsschrift No. 2,533,121 to prepare high-molecular polytriazines by reacting aromatic compounds containing hydroxyl groups and amino groups with a cyanogen halide and then subjecting the product to a heat treatment.

German Offenlegungsschrift No. 2,546,337 describes polytriazines which are obtained by a condensation reaction of compounds containing hydroxyl groups and amino groups with cyanuric chloride and by a subsequent stepwise reaction of the products with diphenols or polyphenols and a cyanogen halide. In German Offenlegungsschrift No. 2,546,315, diamines or polyamines are used in place of diphenols or polyphenols for the preparation of similar polytriazines. In German Offenlegungsschrift No. 2,546,270, the polytriazines are again obtained by a condensation reaction of cyanuric chloride with phenols containing primary and secondary amino groups and by a subsequent reaction of the products with a cyanogen halide.

Moreover, the homopolymerisation and copolymerisation of alkylene-dicyanamides is described in U.S. Pat. No. 3,291,673. This gives hard, colourless and transparent polymers, the structure of which is not described in more detail.

U.S. Pat. No. 3,308,101 has disclosed that the reaction of mono-cyanamides with bis-cyanamides leads to crosslinked polymers having recurring melamine structural units.

Moreover, the preparation of substituted polyamines by the polyaddition of bis-cyanamides of secondary alkylenediamines by heat treatment is described in U.S. Pat. No. 3,779,997.

It is also known that N-cyanolactams are effective polymerisation catalysts, for example for the anionic polymerisation of α-pyrrolidone (German Auslegeschrift No. 1,261,671) or in the preparation of polyamides (German Offenlegungsschrift No. 1,905,098).

It has now been found that N-cyanolactams are suitable as polymerisation components, capable of undergoing an addition reaction, for the preparation of crosslinked polyadducts.

The present invention therefore relates to a mixture for the preparation of crosslinked nitrogen-containing polyadducts, which mixture comprises (a) an N-cyanolactam of the formula I or II

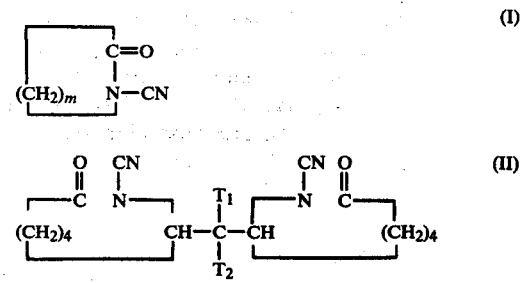

in which m is an integer from 2 to 11, the methylene carbon atoms are unsubstituted or are substituted by a total of one or two methyl or ethyl groups, and $T_1$ and $T_2$ independently of one another are hydrogen or methyl, and (b) a monomeric or oligomeric organic compound having at least 2 C atoms and at least 2 amino groups or at least one amino group and one hydroxyl group.

A preferred embodiment of the invention is represented by mixtures wherein component (b) is present in such quantities that there are 0.2 to 3.0 amine equivalents of component (b) per mol of (a).

Examples of suitable compounds of the formula I are N-cyanopyrrolidone, N-cyanopiperidone, N-cyanocaprolactam, N-cyanocapryllactam, N-cyano-oenantholactam, N-cyanocaprilactam, N-cyanolaurolactam, N-cyano-ε-methylcaprolactam or N-cyano-ε-ethylcaprolactam.

Preferably, m is an integer from 3 to 5.

$T_1$ and $T_2$ in the compounds of the formula II are preferably hydrogen.

The following organic compounds can be used as the component (b):

A. Diamines

Monomeric and oligomeric compounds which contain diprimary, primary-secondary or disecondary amino groups.

1. Primary diamines of the formula III $$NH_2—R_1—NH_2 \qquad (III)$$

in which $R_1$ is a $C_nH_{2n}$ group which can be uninterrupted or interrupted by O-bridges and in which n is 2–12, or $R_1$ is $C_5$–$C_7$ cycloalkylene which is unsubstituted or is substituted by one or two $C_1$–$C_4$ alkyl groups, or $R_1$ is phenylene or one of the groups

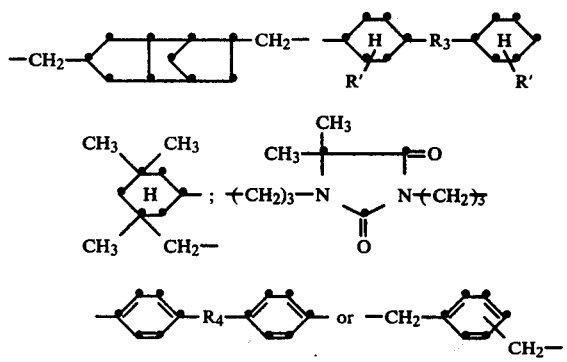

$R_3$ being $—CH_2$— or 2,2-propylene, $R'$ being hydrogen or methyl and $R_4$ being $—CH_2$—, 2,2-propylene, $—SO_2$—, $—O$— or $—NH—CO—NH$—.

Examples of compounds of the formula III are:

ethylenediamine, 1,2-diaminopropane, 1,3-diaminopropane, 1,4-diaminobutane, 1,6-diaminohexane, 2,2,4-trimethylhexamethylenediamine, neopentanediamine, 1,2-bis-(γ-aminopropoxy)-ethane, 1,2-bis-(γ-aminopropoxy)-propane, 1,2-diaminocyclohexane, 1,3-diamino-cyclohexane, 1,4-diamino-cyclohexane, 1,4-diamino-3,6-diethylcyclohexane, 4,4'-diaminodicyclohexylmethane, 2,2-(4',4''-diamino-dicyclohexyl)-propane, 3,5,5-trimethyl-3-aminomethyl-cyclohexylamine (isophoronediamine), 3,3'-dimethyl-4,4'-diamino-dicyclohexylmethane, 3,8-diaminomethyl-tricyclo[5.2.1.0$^{2,6}$]decane, o-phenylenediamine, m-phenylenediamine, p-phenylenediamine, 4,4'-diamino-diphenylmethane, 2,2-bis-(p-aminophenyl)-propane, 4,4'-diamino-diphenyl sulfone, 4,4'-diaminodiphenyl ether, 4,4'-diamino-diphenylurea, 2,2'-diamino-diphenylmethane, o-xylylenediamine, m-xylylenediamine, p-xylylenediamine or 1,3-bis-(γ-aminopropyl)-5,5-dimethylhydantoin.

2. Primary diamines containing amide groups, of the formula IV:

$$NH_2-(CH_2)_p-CO-NH-R_2NH_2 \quad (IV)$$

in which $R_2$ is a $C_qH_{2q}$ group, q being a number from 2 to 6 and p being a number from 3 to 5.

Examples of compounds of the formula IV are: N-(2-aminoethyl)-γ-aminobutyric acid amide and N-(6-aminohexyl)-ε-aminocaproic acid amide.

3. Compounds of the formula V which are formed by adding pyrrolidone or caprolactam to diamines of the formula $NH_2-R_2-NH_2$, $$N+NH-(CH_2)_p-CO+_xNH-R_2-N-H+CO-(CH_2)_p-NH+_yH \quad (V)$$

in which $R_2$ and p are as defined above and the sum of x+y is 1–20.

4. Polyamides of the formula VI $$NH_2-R_2NH+CO-R_5-CO-NH-R_2-NH+_zCO-R_5-CO-NH-R_2-NH_2 \quad (VI)$$

in which $R_2$ is as defined, $R_5$ is a $-(CH_2)_r$ group, 1,3- or 1,4-phenylene, r is a number from 3 to 12 and z is a number from 1 to 20.

5. Secondary diamines of the formulae VII–IX $$R_6-NH-R_8-NH-R_7 \quad (VII)$$

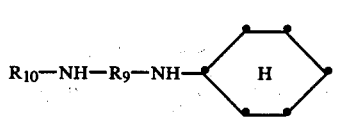

(VIII)

(IX)

in which $R_6$ and $R_7$ are identical or different and are a $C_1$-$C_4$ alkyl radical, and $R_8$ is cyclohexylene or the group

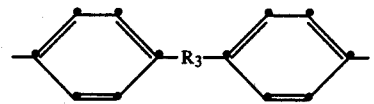

in which $R_3$ is as defined under (1), $R_9$ is a $-(CH_2)_q$ group, q being a number from 2 to 6, and $R_{10}$ is hydrogen or cyclohexyl.

Examples of secondary diamines are: N,N'-dimethyl-1,4-diaminocyclohexane, N,N'-diethyl-1,4-diaminocyclohexane, 4,4'-di-(N-methylamino)-diphenylmethane, 4,4'-di-(N-ethylamino)-diphenylmethane, 4,4'-di-(N-butylamino)-diphenylmethane, N-(γ-aminopropyl)-cyclohexylamine and N,N'-dicyclohexyl-1,6-diaminohexane.

6. Diamines which are copolymers based on polybutadiene and acrylonitrile and containing terminal amino groups, and have a means molecular weight of 3,000 to 4,000.

7. Polyether-amines which can be obtained by reacting polyethylene glycols or polypropylene glycols with ammonia and have a mean molecular weight of 200–2,200, in particular α,ω-diamino-polypropylene glycols.

B. Polyamines

Compounds containing more than two primary and/or secondary amino groups:

1. Polyamines of the formula X which can be obtained by reducing the addition products of acrylonitrile with trihydroxy and tetrahydroxy compounds $$R_o+O-CH_2CH_2CH_2-NH_2)_r \quad (X)$$

in which $R_o$ is an r-valent saturated, straight-chain or branched aliphatic radical having 3 to 6 C atoms and r is 3 or 4.

Examples of compounds of the formula X are: 1,1,1-tris-(γ-aminopropoxymethyl)-ethane, 1,1,1-tris-(γ-aminopropoxymethyl)-propane, tetra-(γ-aminopropoxymethyl)-methane and 1,2,6-tris-(γ-aminopropoxy)-hexane.

2. Polyamines which are formed by reacting a mixture of dimerised and oligomerised linoleic acid or ricinoleic acid with diethylenetriamine, triethylenetetramine and the like, such as are obtainable from Messrs. Schering AG under the trade name "Versamide."

3. Polyamines of the formula XI $$NH_2-R_{14}-NH_2 \quad (XI)$$

in which $R_{14}$ is a group $+CH_2CH_2-NH+_vCH_2CH_2-$

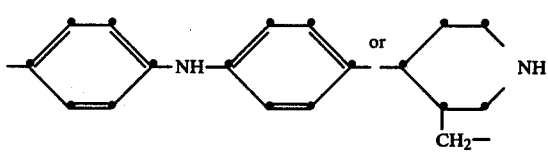

in which v is a number from 1 to 3.

C. Amines containing hydroxyl groups, of the formula XII $$NH_2-R_{11}-OH \quad (XII)$$

in which $R_{11}$ is a group $C_tH_{2t}$ which is uninterrupted or interrupted by O-bridges and/or N-bridges and in which t is a number from 2 to 12.

Examples of compounds of the formula XII are: ethanolamine, 3-propanolamine, 2-(β-hydroxyethoxy)-ethylamine, addition products of 1 mol of ethylene oxide or propylene oxide per amino group to diamines and polyamines, for example 2-hydroxyethyl-ethylenediamine, 2-hydroxyethyl-1,3-propylenediamine, N-(2-hydroxyethyl)-diethylenetriamine or N,N'-bis-(2-hydroxyethyl)-triethylenetetramine.

Mixtures of the compounds mentioned can also be used as component (b).

Preferred components (b) are compounds of the formula III, in which $R_1$ is a $C_nH_{2n}$ group, n being a number from 2 to 12, or $C_5$-$C_7$ cycloalkylene, or compounds of the formula VIII, wherein $R_9$ is a $-(CH_2)_q-$ group, q being a number from 2 to 6, and $R_{10}$ is hydrogen or cyclohexyl.

Ethylenediamine, 1,2-diaminopropane, 1,4-diaminobutane, 1,6-diaminohexane, 2,2,4-trimethylhexamethylenediamine, 4,4'-diaminodicyclohexylmethane, N-(γ-aminopropyl)-cyclohexylamine or isophoronediamine are particularly preferred.

Moreover, those mixtures are preferred in which up to 30 mol % of the amine equivalents of component (b) are replaced by (c) a monoamino compound of the formula

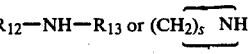

$R_{12}-NH-R_{13}$ or $(CH_2)_s\,NH$ in which $R_{12}$ is straight-chain or branched $C_2$-$C_{16}$ alkyl, allyl, $C_5$-$C_6$ cycloalkyl, phenyl, benzyl or furfuryl, $R_{13}$ is hydrogen, $C_1$-$C_4$ alkyl or allyl and s is an integer from 5 to 7.

A further preferred embodiment of the invention is represented by mixtures in which components (b) and (c) are present in such quantities that there are 0.2 to 3.0 amine equivalents of components (b) and (c) per mol of (a).

$C_2$-$C_{12}$ alkyl $R_{12}$ in the above formula can, for example, be ethyl, isopropyl, n-butyl, n-hexyl, 2-ethylhexyl, n-dodecyl or n-hexadecyl.

$C_5$-$C_6$ cycloalkyl $R_{12}$ can, for example, be cyclopentyl or especially cyclohexyl.

$C_1$-$C_4$ alkyl $R_{13}$ can, for example, be methyl, ethyl, isopropyl, sec.-butyl or especially n-butyl.

Examples of components (c) are: n-butylamine, n-hexylamine, 2-ethylhexylamine, n-dodecylamine, n-hexadecylamine, cyclohexylamine, benzylamine, aniline, furfurylamine, di-n-butylamine, diallylamine, N-methylcyclohexylamine, pyrrolidine, piperidine and hexamethyleneimine.

n-Butylamine, di-n-butylamine, benzylamine, aniline and toluidine are preferred monoamino compounds (c).

The mixtures of the invention can, according to the definition, be used for the preparation of novel cross-linked nitrogen-containing polyadducts which are infusible, insoluble high-molecular substances. The invention also relates to novel crosslinked hydrogen-containing polyadducts which are obtained by reacting the mixture according to the invention.

The polyaddition reaction can be carried out at 0° C. to +300° C., preferably at +20° C. to +250° C.

The flexibility of the crosslinked mouldings can be increased by the addition of component (c). Moreover, for reasons of process technology, it can be desirable to reduce the viscosity of the resin mixture, which is to be processed, by means of component (c).

N-Cyanolactams react with diamino and polyamino compounds or aminoalcohols, cyclic and linear trimerisation and oligomerisation products being formed. The addition of the amino group to an N-cyanolactam takes place with the formation of amide groups, whilst amide groups and ester groups are formed when aminoalcohols are added to N-cyanolactam. A free, highly reactive cyanamide group here appears as an intermediate. The course of the reaction can be illustrated by the scheme which follows:

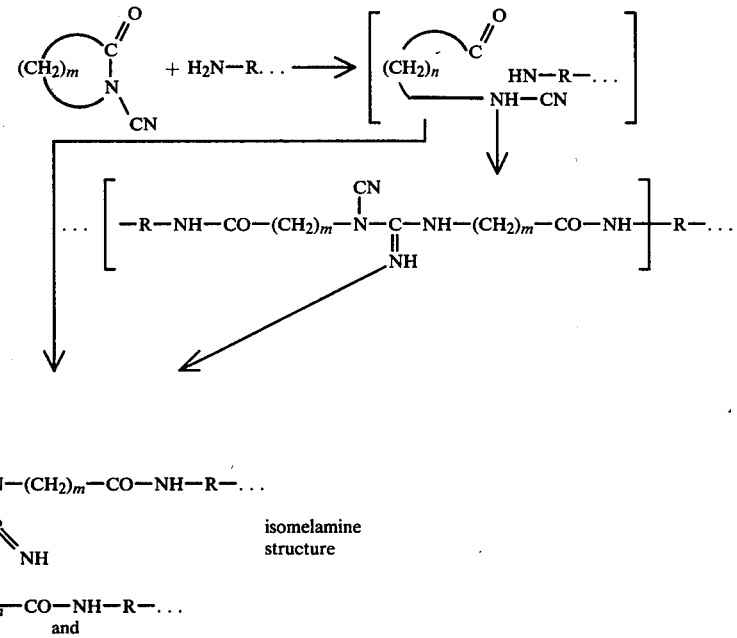

isomelamine structure and

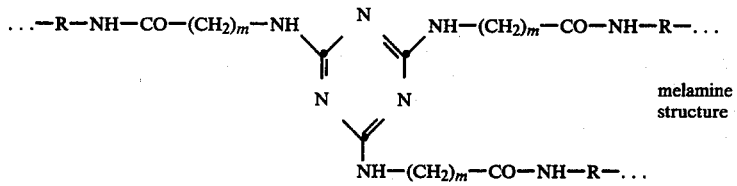

melamine structure in which R is the organic radical of component (b).

Linear oligomerisation products as well as isomelamine structures and melamine structures participate in the formation of the crosslinked polyadducts.

The polyaddition can be carried out in the presence of a catalyst, if desired. Examples of suitable catalysts are tertiary amines, such as triethylamine or benzyldimethylamine, pyridine and substituted pyridine derivatives, for example 4-dimethylaminopyridine and 4-pyrrolidinopyridine, alkali metal alcoholates, for example sodium hexylate, imidazoles, for example 2-ethyl-4-methylimidazole, quaternary ammonium salts, for example tetramethylammonium chloride or benzyltrimethylammonium chloride, Lewis acids, for example tin-II chloride, lithium chloride and also boron trifluoride-etherate or N-p-chlorophenyl-N',N'-dimethylurea. The catalytically active tertiary amino groups can also be built into the component (b), examples being N,N-dimethyl-1,2-diaminopropane or 1-(γ-aminopropyl)-piperazine.

The catalysts can be employed in quantities of 0.1 to 5% by weight, preferably 0.1 to 2% by weight, relative to the reaction mixture.

The starting compounds of the formula I and II can be prepared by the process described in German Offenlegungsschrift Nos. 1,905,098 or 1,175,678. They are distinguished by good storage stability, even at an elevated temperature.

The amine compounds of components (b) and (c) are commercially available, or they can be prepared in a simple manner by known methods.

The mixtures according to the invention can be used as casting resins, adhesives or foam materials. They can also be processed into coatings on substrates, such as wood, glass, textiles, metal or earthenware, and fillers, such as activated carbon, carbon black, wood flour, kieselguhr, pigments, glass fibres or metal powders can be added to the mixtures before processing.

The examples which follow illustrate the invention.

EXAMPLES

The resin systems are examined by torsional bond strength tests. For this purpose, the N-cyanolactam and an equivalent quantity of the amine compound (1 equivalent of NH$_2$ per mol of cyanolactam) are mixed, more or less viscous, homogeneous mixtures being formed at room temperature or slightly elevated temperature, if necessary. In some cases, catalytic quantities of a catalyst are added to the mixtures.

To measure the torsional bond strength, 5 hollow cylinders (12 mm external diameter) of aluminum are bonded to a strong aluminum plate by means of the resin mixture to be tested, the adhesion surfaces of the cylinder and of the plate first being cleaned and treated by the pickling process (1 hour in chromic/sulfuric acids at 60° C.). The test specimens are then subjected to different curing periods and temperatures. After cooling to room temperature, a steadily increasing torsional moment is applied to the hollow cylinders by means of a hexagon pipe. The torque which stresses the bond is measured via a lever arm by a force transducer and electrically recorded. The shear stress in the adhesive layer then increases until fracture occurs, the force to be applied for fracture being recorded in Nmm$^{-2}$.

EXAMPLE 1

N-Cyanopyrrolidone and 1,6-diaminohexane are mixed in a molar ratio of 2:1 and cured at different temperatures. Measurement of the torsional bond strength gave the following results:

Cured for 1 hour at 100° C.: 90.0 Nmm$^{-2}$
Cured for 1 hour at 140° C.: 103.9 Nmm$^{-2}$
Cured for 1 hour at 180° C.: 98.1 Nmm$^{-2}$
Cured for 5 hours at 140° C.: 108.2 Nmm$^{-2}$.

EXAMPLE 2

N-Cyanopiperidone and 1,6-diaminohexane are mixed in a molar ratio of 2:1 and cured at different temperatures. Measurement of the torsional bond strength gave the following results:

Cured for 1 hour at 100° C.: 56.1 Nmm$^{-2}$
Cured for 1 hour at 140° C.: 74.3 Nmm$^{-2}$.

EXAMPLE 3

N-Cyanocaprolactam and 1,6-diaminohexane are mixed in a molar ratio of 2:1 and cured at different temperatures. Measurement of the torsional bond strength gave the following results:

Cured for 1 hour at 100° C.: 57 Nmm$^{-2}$
Cured for 1 hour at 140° C.: 79 Nmm$^{-2}$
Cured for 1 hour at 180° C.: 82 Nmm$^{-2}$
Cured for 5 hours at 140° C.: 83 Nmm$^{-2}$.

EXAMPLES 4–6

Testing of the polyadducts in the form of films

To produce the films, the following mixtures are prepared:

4. 3.40 g (0.02 mol) of isophoronediamine and 5.52 g (0.04 mol) of N-cyanocaprolactam are mixed at a temperature of 25° C. The gelling times are 29 minutes at 100° C. and 5 minutes 25 seconds at 140° C.
5. 2.32 g (0.02 mol) of 1,6-diaminohexane and 5.52 g (0.04 mol) of N-cyanocaprolactam are mixed at a temperature of 40° C. The gelling times are 4 minutes at 100° C. and 2 minutes at 120° C.
6. 3.96 g (0.02 mol) of 4,4'-diamino-diphenylmethane and 5.52 g (0.04 mol) of N-cyanocaprolactam are mixed at a temperature of 75° C. The gelling time is 2 hours 54 minutes at 140° C.

All the mixtures are relatively low-viscosity liquids of pale yellow colour.

With the aid of a quadruple film-spreader (type 360), the mixtures are applied in a layer 200 μm thick, without a solvent, to sheet iron of dimensions of 350×70×0.6 mm, the sheet iron having been degreased with acetone beforehand. The film specimens are cured under the conditions indicated in the table.

The following test values are summarised in the table:

E=Erichsen deep-drawing test value (DIN 53,156), measured at 20° C. and 65% relative humidity (RH). Indicated in mm.

D=Mandrel bending test (DIN 53,152). The mandrel diameter is 15 mm. Indicated in $\sphericalangle°$.

RJ=Reverse impact test, the impact being applied to the substrate (sheet iron) by a test hammer weighing 1 kg. The diameter of the impacting hemisphere is 2 cm. Test temperature: 20° C. at 65% RH.

TABLE

| Example | Curing conditions | | E (mm) | D $\sphericalangle°$ | RJ |
|---|---|---|---|---|---|
| | Time | Temperature | | | |
| 4 | 1 hour | 120° C. | 4.6 | 80 | 10/1 |
| 5 | 1 hour | 120° C. | 10 | 180 | 100/2 |
| 6 | 3 hours + 6 hours | 120° C. 180° C. | 1.1 | 115 | 15/1 |
| 5 | 3 days | 25° C. | 10 | 180 | 100/2 |

EXAMPLE 7

Testing the polyadducts in the form of cast sheet

To prepare a cast sheet of size 200×200×4 mm from N-cyanocaprolactam and isophoronediamine in a molar ratio of about 2:1, 123.6 g (0.89 mol) of N-cyanocaprolactam (95% pure) and 72.4 g (0.43 mol) of isophoronediamine are mixed at room temperature in a glass beaker. The mixture is at once degassed briefly in a high vacuum under 1.333 Pa. Immediately afterwards, the mixture is poured into a mould which has been pre-treated with a commercially available release agent based on a silicone oil. The filled mould is left to stand at room temperature for 10 minutes, is then heated from room temperature to 180° C. in an oven in the course of 30 minutes and is kept at 180° C. for one further hour.

This gives slightly yellowish transparent moulded sheets having the following properties:

| | |
|---|---|
| flexural strength (maximum) (VSM* 77,103) | 165.10 Nmm$^{-2}$ |
| flexural strength (at break) (VSM 77,103) | 141.85 Nmm$^{-2}$ |
| deflection (maximum) (VSM 77,103) | 10.28 mm |
| deflection (at break) (VSM 77,103) | 15.65 mm |
| impact strength (VSM 77,105) | 22.58 kJ/m$^2$ |
| tensile strength (maximum) (DIN** 53,455) | 72.48 Nmm$^{-2}$ |
| tensile strength (at break) (DIN 53,455) | 72.48 Nmm$^{-2}$ |
| elongation (maximum) (DIN 53,455) | 2.44% |
| elongation (at break) (DIN 53,455) | 2.44% |

*VSM = Verein Schweizerischer Maschinenindustrieller. [Association of Swiss Machine Manufacturers].
**DIN = Deutsche Industrie-Norm. [German Industrial Standard].

What is claimed is:

1. A mixture for the preparation of a crosslinked nitrogen-containing resinous polyadduct, which comprises (a) an N-cyanolactam of the formula I or II

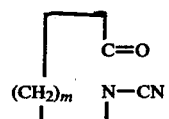

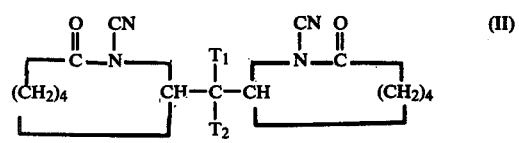

in which m is an integer from 2 to 11, the methylene carbon atoms are unsubstituted or are substituted by a total of one or two methyl or ethyl groups, and $T_1$ and $T_2$ independently of one another are hydrogen or methyl, and (b) a monomeric or oligomeric organic compound having at least 2 C atoms and at least 2 amino groups or at least one amino group and one hydroxyl group.

2. A mixture according to claim 1, which contains such quantities of component (b) that there are 0.2 to 3.0 amine equivalents of component (b) per mol of (a).

3. A mixture according to claim 1, wherein component (a) is a compound of the formula I according to claim 1, in which m is 3 to 5.

4. A mixture according to claim 1, wherein component (a) is a compound of the formula II according to claim 1, in which $T_1$ and $T_2$ are hydrogen.

5. A mixture according to claim 1, wherein component (b) is a diamine of the formula III $NH_2—R_1—NH_2$, in which $R_1$ is a $C_nH_{2n}$ group, n being a number from 2 to 12, or $C_5-C_7$ cycloalkylene, or (b) is a compound of the formula VIII

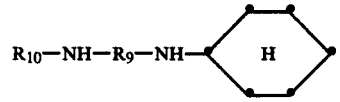

in which $R_9$ is a $+CH_2)_q$ group, q being a number from 2 to 6 and $R_{10}$ being hydrogen or cyclohexyl.

6. A mixture according to claim 1, wherein component (b) is ethylenediamine, 1,2-diaminopropane, 1,4-diaminobutane, 1,6-diaminohexane, 2,2,4-trimethylhexamethylenediamine, 4,4'-diaminodicyclohexylmethane, N-(γ-aminopropyl)-cyclohexylamine or isophoronediamine.

7. A mixture according to claim 1, wherein up to 30 mol % of the amine equivalents of component (b) are replaced by (c) a monoamino compound of the formula

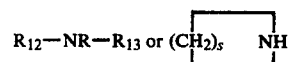

in which $R_{12}$ is a straight-chain or branched $C_2-C_{16}$ alkyl, allyl, $C_5-C_6$ cycloalkyl, phenyl, benzyl or furfuryl, $R_{13}$ is hydrogen, $C_1-C_4$ alkyl or allyl and s is an integer from 5 to 7.

8. A mixture according to claim 7, which contains such quantities of components (b) and (c) that there are 0.2 to 3.0 amine equivalents of components (b) and (c) per mol of (a).

9. A mixture according to claim 7, wherein component (c) is n-butylamine, di-n-butylamine, benzylamine, aniline or toluidine.

10. A crosslinked nitrogen-containing, resinous polyadduct, which is obtained by reacting a mixture according to claim 1.

* * * * *